(12) United States Patent
Saegusa et al.

(10) Patent No.: US 10,217,984 B2
(45) Date of Patent: Feb. 26, 2019

(54) SEPARATOR AND LITHIUM ION SECONDARY BATTERY INCLUDING THE SAME

(71) Applicant: TDK CORPORATION, Tokyo (JP)

(72) Inventors: Masahiro Saegusa, Tokyo (JP);
Hirokazu Ohnuma, Tokyo (JP); Bungo Sakurai, Tokyo (JP)

(73) Assignee: TDK CORPORATION, Tokyo (JP)

( * ) Notice: Subject to any disclaimer, the term of this patent is extended or adjusted under 35 U.S.C. 154(b) by 683 days.

(21) Appl. No.: 14/868,739

(22) Filed: Sep. 29, 2015

(65) Prior Publication Data

US 2016/0093858 A1    Mar. 31, 2016

(30) Foreign Application Priority Data

Sep. 29, 2014  (JP) .................................. 2014-198308
Aug. 27, 2015  (JP) .................................. 2015-167830

(51) Int. Cl.
*H01M 2/16* (2006.01)
*H01M 10/42* (2006.01)
*H01M 10/0525* (2010.01)

(52) U.S. Cl.
CPC ......... *H01M 2/166* (2013.01); *H01M 2/1686* (2013.01); *H01M 10/4235* (2013.01); *H01M 10/0525* (2013.01)

(58) Field of Classification Search
None
See application file for complete search history.

(56) References Cited

U.S. PATENT DOCUMENTS

2011/0143183 A1*  6/2011  Matsumoto ......... H01M 2/1626
                                                          429/144
2012/0202102 A1     8/2012  Kakibe et al.

FOREIGN PATENT DOCUMENTS

CN     102468466 A           5/2012
JP     2012252969 A     *   12/2012
JP     5239302 B2            7/2013

* cited by examiner

*Primary Examiner* — Basia A Ridley
*Assistant Examiner* — Heng M. Chan
(74) *Attorney, Agent, or Firm* — Oliff PLC

(57) ABSTRACT

A separator according to the embodiment includes a porous base material having a thermoplastic resin. The porous base material has a heat-resistant porous layer on at least one surface thereof. The heat-resistant porous layer contains inorganic particles, a resin, and sulfur. A lithium ion secondary battery according to the embodiment, includes: the separator interposed between a positive electrode and a negative electrode; and an electrolyte solution. The heat-resistant porous layer is disposed between the positive electrode and the porous base material. Sulfur is distributed unevenly in the heat-resistant porous layer so as to exist in larger amount near a surface thereof opposite to the porous base material.

21 Claims, 1 Drawing Sheet

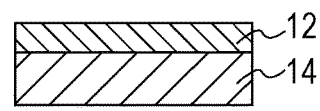
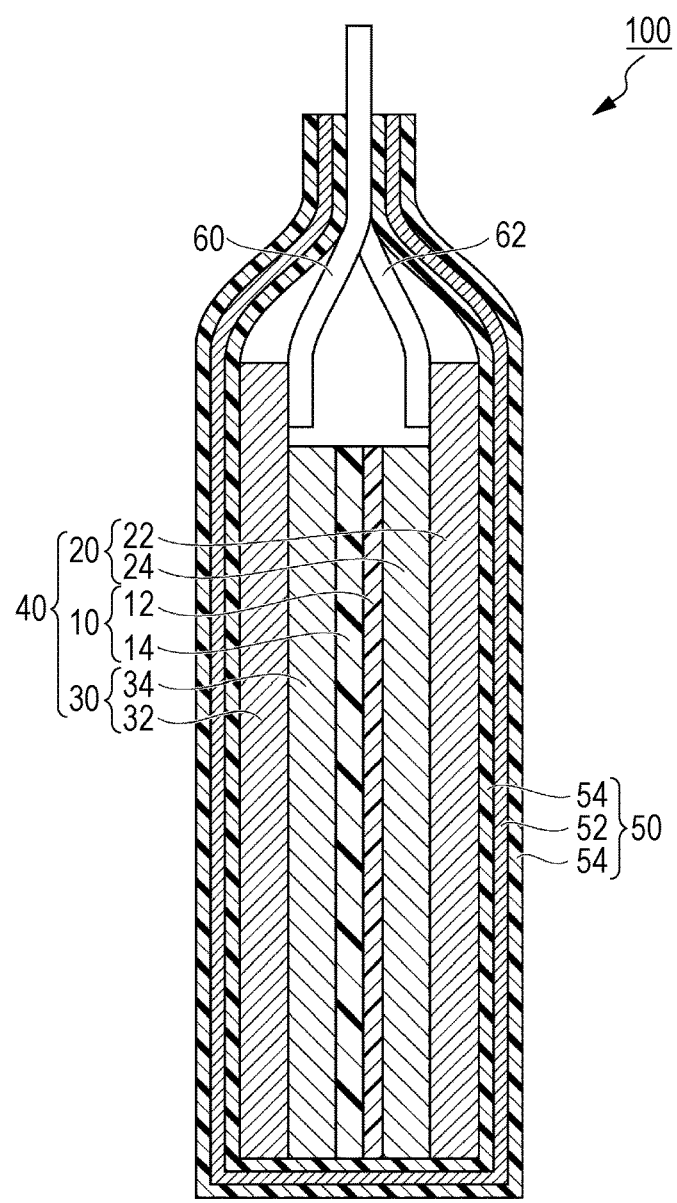

SEPARATOR AND LITHIUM ION SECONDARY BATTERY INCLUDING THE SAME

CROSS-REFERENCE TO RELATED APPLICATION

This application claims priority from Japanese Patent Application No. 2014-198308 filed with the Japan Patent Office on Sep. 29, 2014, the entire content of which is hereby incorporated by reference.

BACKGROUND

1. Technical Field

The present disclosure relates to a separator and a lithium ion secondary battery including the same.

2. Related Art

In recent years, along with the spread of portable information electronic appliances such as portable phones, video cameras, and laptop computers, such appliances have rapidly come to have higher performance, smaller size, and lighter weight. As the power source used for these appliances, secondary batteries, particularly lithium ion secondary batteries have been demanded more and more from the perspectives of overall favorable balances of the economic efficiency, the high performance, and the small size and weight. Even some hybrid cars and electric vehicles employ the lithium ion secondary battery. Moreover, the further performance increase and size reduction of such electronic appliances have been advanced. Along with this advancement, the lithium ion secondary battery has been required to have higher reliability and longer life.

For the separator applicable to the lithium ion secondary battery, various kinds of thermoplastic porous layers have been suggested. For example, Japanese Patent No. 5239302 has discussed that the inorganic coated separator having the separator as the base and the heat-resistant porous layer containing inorganic particles and a resin on the separator is used for the higher safety and reliability. According to Japanese Patent No. 5239302, even if the temperature in the battery has increased to high temperature of a certain degree due to the flow of abnormal current in the occurrence of short-circuiting or the like, the inorganic coated separator will not be broken at that temperature. This enables to maintain the shutdown state.

SUMMARY

A separator according to the embodiment includes a porous base material having a thermoplastic resin. The porous base material has a heat-resistant porous layer on at least one surface thereof. The heat-resistant porous layer contains inorganic particles, a resin, and sulfur.

BRIEF DESCRIPTION OF DRAWINGS

FIG. 1 is a schematic sectional view of a separator according to an embodiment.

FIG. 2 is a schematic sectional view of a lithium ion secondary battery according to an embodiment.

DETAILED DESCRIPTION

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

If, however, the separator with the heat-resistant porous layer as above has the low adhesion between the heat-resistant porous layer and the thermoplastic porous layer or the low adhesion between the inorganic particles and the resin contained in the heat-resistant porous layer, the inorganic particles will fall off, which may lead to a problem. In the fabrication of the battery, the inorganic particles fallen and scattered around might enter the movable portion of the fabrication apparatus to cause a trouble. In addition, the portion from which the inorganic particles have been fallen has the thinner heat-resistant porous layer than the other portion. Such a thinner portion may have lower insulating properties and therefore may have larger leakage current to cause the large self-discharge. In some cases, this may adversely affect the battery performance, for example, the falloff of the inorganic particles causes the short-circuiting. For these reasons, it is necessary to prevent the falloff of the inorganic particles as much as possible. To prevent the falloff of the inorganic particles, it is important to increase the peeling strength between the heat-resistant porous layer and the thermoplastic porous layer and the adhesion strength in the heat-resistant porous layer.

In view of the above, an object of the present disclosure is to provide a separator in which the falloff of the inorganic particles is suppressed by improving the adhesion strength in the heat-resistant porous layer, and provide a lithium ion secondary battery including the separator.

A separator according to an embodiment of the present disclosure for achieving the above object includes a porous base material including a thermoplastic resin. The porous base material has a heat-resistant porous layer on at least one surface thereof. The heat-resistant porous layer includes inorganic particles, a resin, and sulfur.

In the separator according to the embodiment, the falloff of the inorganic particles is suppressed by improving the adhesion strength in the heat-resistant porous layer, and the reason thereof is considered as below. The sulfur contained in the heat-resistant porous layer produce various functional groups containing sulfur or an inorganic compound containing sulfur or the like on a surface of the inorganic particle. The functional group or the inorganic compound adheres to the resin more firmly than the inorganic compound originally included in the particle. This can reduce the falloff of the inorganic particles contained in the heat-resistant porous layer.

When the binding energy of the heat-resistant porous layer of the separator according to the embodiment is measured by the X-ray photoelectron spectroscopy, the measurement value of the binding energy of at least a part of the sulfur may have a peak in the range of 166 eV to 174 eV. In the separator with the above structure, the surface of the inorganic particle is modified to react with a part of the resin. This enables the firmer adhesion between the inorganic particles and the resin.

The heat-resistant porous layer of the separator according to the present disclosure may have a compound containing sulfur.

The compound containing sulfur in the separator according to the embodiment may be an organosulfate. In the separator with the above structure, the inorganic particles adhere to the resin more firmly.

The compound containing sulfur in the separator according to the embodiment may be 1,3,2-dioxathiolane 2,2-dioxide (DTD). In the separator with the above structure, the inorganic particles adhere to the resin more firmly.

The total amount of 1,3,2-dioxathiolane 2,2-dioxide (DTD) contained in the separator according to the embodiment may be 1 to 3 mol % relative to all the elements of the heat-resistant porous layer. In the separator with the above structure, sulfur derived from 1,3,2-dioxathiolane 2,2-dioxide (DTD) adhere to both surfaces of the separator. This improves the adhesion, which makes the capacity retention at high temperature higher.

The inorganic particles in the separator according to the embodiment may be alumina or boehmite. The heat-resistant porous layer containing sulfur and alumina or boehmite as above would form an excellent SEI film through the reaction with the sulfur. This improves the adhesion between the heat-resistant porous layer and the positive or negative electrode. Thus, the separator capable of preventing the short-circuiting by avoiding the thermal contraction of the separator can be provided.

The resin in the separator according to the embodiment may be at least one of styrene-butadiene rubber (SBR) and poly(acrylic acid) (PAA). This structure can provide the separator with higher adhesion between the heat-resistant porous layer and the porous base material.

A lithium ion secondary battery according to the embodiment includes the separator interposed between a positive electrode and a negative electrode, and an electrolyte solution. The heat-resistant porous layer is disposed between the positive electrode and the porous base material. Sulfur is distributed unevenly in the heat-resistant porous layer so as to exist in larger amount near the surface opposite to the porous base material. This lithium ion secondary battery has high voltage resistance by having the separator in which the falloff of the inorganic particles in the heat-resistant porous layer is suppressed and the portion with the thin heat-resistant porous layer (deficient portion) is small.

According to the present disclosure, the separator in which the falloff of the inorganic particles in the heat-resistant porous layer is suppressed, and the lithium ion secondary battery including the separator can be provided.

An example of the lithium ion secondary battery according to the embodiment is specifically described with reference to the drawings. The lithium ion secondary battery according to the present disclosure, however, is not limited to the embodiment below. The dimension ratio of the actual components of the lithium ion secondary battery is not limited to the illustrated one.

(Lithium Ion Secondary Battery)

Brief description is made of the electrode and the lithium ion secondary battery according to the embodiment with reference to FIG. 2. A lithium ion secondary battery 100 mainly includes a stacked body 40, a case 50 housing the stacked body 40 in a sealed state, and a pair of leads 60 and 62 connected to the stacked body 40. Moreover, an electrolyte solution, which is not shown, is contained in the case 50 together with the stacked body 40.

The stacked body 40 includes a positive electrode 20 and a negative electrode 30 disposed opposite to each other with a separator 10 interposed therebetween. The positive electrode 20 includes a plate-shaped (film-shaped) positive electrode current collector 22, and a positive electrode active material layer 24 provided on the positive electrode current collector 22. The negative electrode 30 includes a plate-shaped (film-shaped) negative electrode current collector 32, and a negative electrode active material layer 34 provided on the negative electrode current collector 32. The positive electrode active material layer 24 is in contact with one side of the separator 10 while the negative electrode active material layer 34 is in contact with the other side thereof. The positive electrode current collector 22 has an end thereof connected to the lead 62 while the negative electrode current collector 32 has an end thereof connected to the lead 60. An end of the lead 60 and an end of the lead 62 extend out of the case 50.

The positive electrode 20 and the negative electrode 30 are collectively referred to as the electrodes 20 and 30. The positive electrode current collector 22 and the negative electrode current collector 32 are collectively referred to as the current collectors 22 and 32. The positive electrode active material layer 24 and the negative electrode active material layer 34 are collectively referred to as the active material layers 24 and 34.

(Separator)

The separator 10 according to the embodiment includes a thermoplastic porous layer 14 and a heat-resistant porous layer 12 applied on at least one surface of the thermoplastic porous layer 14 as illustrated in FIG. 1. The heat-resistant porous layer 12 contains a resin, inorganic particles, and sulfur.

(Heat-Resistant Porous Layer)

The heat-resistant porous layer 12 according to the embodiment mainly contains the resin and the inorganic particles. The heat-resistant porous layer 12 has air permeability due to the space between the inorganic particles. The heat-resistant porous layer 12 additionally contains the resin and sulfur for increasing the binding force between the inorganic particles. The thickness of the heat-resistant porous layer is selected as appropriate. The thickness may be, for example, 0.1 to 10 μm, particular to 0.3 to 8 μm. In the embodiment, particularly, the thickness can be set to 0.5 to 5 μm (Resin)

Examples of the resin for binding the inorganic particles include: polysaccharides such as hydroxymethyl cellulose, ethyl cellulose, methyl cellulose, carboxymethyl cellulose, carboxyethyl cellulose, agar, carrageenan, furcellaran, pectin, starch, mannan, curdlan, honest gum, amylum, pullulan, guar gum, and xanthan gum; proteins such as gelatin; polyethers such as polyethylene oxide and polypropylene oxide; vinyl alcohols such as polyvinyl alcohol and polyvinyl butyral; and water-soluble polymers including polyacids such as polyacrylic acid and polymethacrylic acid and the metal salt thereof. Further, synthetic polymer emulsion can be used as the resin. Examples of the synthetic polymer emulsion include styrene-butadiene copolymer latex, polystyrene polymer latex, polybutadiene polymer latex, acrylonitrile-butadiene copolymer latex, polyurethane polymer latex, polymethylmethacrylate polymer latex, methylmethacrylate-butadiene copolymer latex, polyacrylate polymer latex, vinyl chloride polymer latex, vinyl acetate polymer emulsion, vinyl acetate-ethylene copolymer emulsion, polyethylene emulsion, carboxy modified styrene butadiene copolymer resin emulsion, acrylic resin emulsion, polyethylene, polypropylene, polyethylene terephthalate, polyamide (PA), polyimide (PI), polyamide-imide (PAI), aromatic polyamide, alginic acid and salts thereof, polyvinylidene fluoride (PVDF), polytetrafluoroethylene (PTFE), tetrafluoroethylene-hexafluoropropylene copolymer (FEP), tetrafluoroethylene-perfluoroalkylvinylether copolymer (PFA), and ethylene-tetrafluoroethylene copolymer (ETFE). Above all, carboxymethyl cellulose and polyacrylic acid as the water-soluble polymers and the styrene-butadiene copolymer latex can be particularly used from the viewpoint of the cost and the higher binding property.

(Inorganic Particles)

Specific examples of the inorganic particles used in the embodiment include: metal oxides such as alumina, boehmite, titania, silica, and zirconia; metal carbonates such as calcium carbonate; metal phosphates such as calcium phosphate; and metal hydroxides such as aluminum hydroxide and magnesium hydroxide. Alumina and boehmite can be particularly used. The average particle diameter of the inorganic particles can be set in the range of 0.01 to 2 μm. When the average particle diameter of the inorganic particles is more than 2 μm, a problem may easily occur, for example, it is difficult to form the heat-resistant porous layer with the appropriate thickness. When the average particle diameter of the inorganic particles is less than 0.01 μm, another problem may occur, for example, the powder may fall off because strength of the applied film deteriorates.

The amount of the inorganic particles to be contained is not particularly limited. The amount thereof can be set to 10 mass % or more and 99 mass % or less, particularly 80 mass % or more and 98 mass % or less relative to 100 mass % of the heat-resistant porous layer. In particular, when the amount is 10 mass % or more, it is likely that the lithium ion conductivity is higher; when the amount is 98 mass % or less, it is likely that the heat-resistant porous layer has higher mechanical strength.

Sulfur contained in the heat-resistant porous layer may be present in any kind of state. The presence of sulfur in the heat-resistant porous layer would produce, for example, various functional groups including sulfur or an inorganic compound containing sulfur on the surface of the inorganic particle. These functional groups and inorganic compound are attached to the resin more firmly than the inorganic compound that is originally contained in the particles. This can reduce the falloff of the inorganic particles included in the heat-resistant porous layer.

The binding energy of the sulfur can be measured through the observation of the heat-resistant porous layer by the X-ray photoelectron spectroscopy. The measurement value of the binding energy of at least a part of the sulfur may have a peak in the range of 166 eV to 174 eV. By using sulfur, the surface of the inorganic particle is modified. The modified surface of the inorganic particle reacts with a part of the resin. Thus, the inorganic particles adheres to the resin more firmly The sulfur may be present as a compound in the heat-resistant porous layer. For example, the compound containing sulfur may be an organosulfate. By using the sulfur-containing compound as above, the inorganic particles can adhere to the resin more firmly. The amount of organosulfate can be set to 0.2 to 4 mol % relative to all the elements of the heat-resistant porous layer.

The compound containing sulfur may be a known compound without the particular limitation. Specific examples thereof include thiols such as 1,3,2-dioxathiolane 2,2-dioxide (DTD) and 1-butanthiol, sultones such as 1,3-propane sultone (PS), and sulfonates such as methane sulfonate, benzene sulfonate, and p-toluene sulfonate. The amount of sulfur to be contained can be set to 0.2 to 4 mol % relative to all the elements of the heat-resistant porous layer. In particular, the amount can be set in the range of 1.2 to 3.2 mol % or 2.2 to 3.1 mol %.

The compound may be present evenly throughout the heat-resistant porous layer. In particular, the compound may be segregated on the surface of the inorganic particle. This causes the compound to be adsorbed by the inorganic particles or to react with the inorganic particles, thereby, for example, generating various functional groups including sulfur or the sulfide of the inorganic particle on the surface of the inorganic particle. As a result, the binding force between the inorganic particles can be improved further. The inorganic particles also adhere to the resin in the heat-resistant porous layer more firmly. This can reduce the falloff of the inorganic particles included in the heat-resistant porous layer.

The lithium ion secondary battery including the separator according to the embodiment includes the separator according to the embodiment interposed between the positive electrode and the negative electrode, and the electrolyte solution. The heat-resistant porous layer is disposed between the positive electrode and the porous base material or between the negative electrode and the porous base material. Sulfur may be distributed unevenly in the heat-resistant porous layer so as to exist in larger amount near the surface opposite to the porous base material. In the fabrication of the lithium ion secondary battery with the above structure, the contact between the heat-resistant porous layer and the electrode in the electrochemical device would cause the chemical reaction in the heat-resistant porous layer. As a result, the adhesion between the inorganic particles is increased to make the heat-resistant porous layer closely attached to the positive or negative electrode. Placing the lithium ion secondary battery with the above structure under high temperature would not cause the separator to have a crease. This can provide the effect that the deterioration of the capacity is suppressed. Moreover, the falloff of the inorganic particles included in the heat-resistant porous layer is suppressed. This provides another effect that the lithium ion secondary battery with high voltage resistance can be provided.

There is no particular limitation on the method of having the sulfur contained in the heat-resistant porous layer 12. For example, a method as below may be employed. First, inorganic particles are mixed with a compound containing sulfur. The obtained mixture is fixed to a surface of the inorganic particle by a method of, for example, firing, hydrothermal synthesis, or mechanical milling. After that, the inorganic particles may be mixed with a resin or solvent to prepare a paint for the heat-resistant porous layer. Alternatively, the compound with sulfur may be mixed with the inorganic particles, a resin, and solvent to prepare the paint for the heat-resistant porous layer. For making the sulfur distributed unevenly in the heat-resistant porous layer so as to exist in larger amount near the surface opposite to the porous base material, the paint for the heat-resistant porous layer described above is applied onto the porous base material and heat treatment is performed for a long time. Specifically, by performing the heat treatment for a long time at 30 to 100° C., the sulfur can be distributed unevenly in the heat-resistant porous layer, though the present disclosure is not limited thereto. The heat treatment may be performed, for example, for 1 to 48 hours.

(Thermoplastic Porous Layer)

The thermoplastic porous layer 14 employed in the embodiment is a porous base material including a thermoplastic resin. The porous base material is not limited to the particular material. Any known porous base material can be used and any fabrication method may be employed for the porous base material. In particular, a porous base material including one or more kinds of resins selected from the group consisting of polyolefins, thermoplastic elastomers, and grafted copolymers with a weight-average molecular weight of 500,000 to 1,500,000 is used. Other examples thereof include polyolefin resins such as polyethylene and polypropylene, and modified polyolefin resins such as an ethylene-acrylic monomer copolymer and an ethylene-vinyl acetate copolymer. Any of these resins can be used alone or two or more kinds thereof may be used in combination.
(Fabrication Method for Separator 10)

Next, a fabrication method for the separator 10 according to the embodiment is described.

The inorganic particles, the resin, and the solvent as the materials for the heat-resistant porous layer are mixed. Examples of the solvent to be used include water and N-methyl-2-pyrrolidone. A method of mixing the components contained in the paint is not limited to the particular method. Moreover, the order of mixing the components is not limited to the particular one.

The paint is applied to the thermoplastic porous layer. A method of applying the paint is not particularly limited and may be a method using any kind of coater or spray.

Next, the solvent in the paint applied on the thermoplastic porous layer is removed. A method of removing the solvent is not particularly limited and may be any kind of drying method.

Through the above process, the separator 10 is fabricated.

One embodiment of the separator and the fabrication method for the same according to the present disclosure has been described in detail but the embodiment of the present disclosure is not limited to the above embodiment.
(Positive Electrode Current Collector)

For the positive electrode current collector 22, any kind of conductive plate material can be used. For example, a metal thin plate of an aluminum, copper, or nickel foil can be used.

The positive electrode active material layer 24 includes a positive electrode active material, a binder, and a necessary amount of conductive material.
(Positive Electrode Active Material)

For the positive electrode active material, any compound containing lithium ions and capable of intercalating and deintercalating lithium ions can be used. Examples of the positive electrode active material include lithium-containing metal oxides such as $LiCoO_2$, $LiNiO_2$, $LiMn_2O_4$, $Li(Co_xNi_yMn_z)O_2$, $Li(Ni_xCo_yAl_z)O_2$, $Li(Mn_xAl_y)_2O_4$, $Li[Li_wMn_xNi_yCo_z]O_2$, $LiVOPO_4$, and $LiFePO_4$. The binder binds the positive electrode active materials to each other and moreover binds the positive electrode active material and the positive electrode current collector 22.
(Binder)

The binder binds the active materials to each other and moreover binds the positive electrode active material and the positive electrode current collector 22. The material of the binder may be any kind of material that enables the aforementioned binding. Examples of the binder include fluorine resins such as polyvinylidene fluoride (PVDF), polytetrafluoroethylene (PTFE), tetrafluoroethylene-hexafluoropropylene copolymer (FEP), tetrafluoroethylene-perfluoroalkylvinylether copolymer (PFA), ethylene-tetrafluoroethylene copolymer (ETFE), polychlorotrifluoroethylene (PCTFE), ethylene-chlorotrifluoroethylene copolymer (ECTFE), and polyvinyl fluoride (PVF).

Other examples of the binder include polyethylene, polypropylene, polyethylene terephthalate, polyamide (PA), polyimide (PI), polyamide-imide (PAI), aromatic polyamide, cellulose, styrene-butadiene rubber (SBR), isoprene rubber, butadiene rubber, ethylene-propylene rubber, polyacrylic acid and its salt, and alginic acid and its salt. In addition, the following thermoplastic elastomer polymers are also applicable: a styrene-butadiene-styrene block copolymer and a hydrogen-added styrene-butadiene-styrene block copolymer, a styrene-ethylene-butadiene-styrene copolymer and a hydrogen-added styrene-ethylene-butadiene-styrene copolymer, a styrene-isoprene-styrene block copolymer and a hydrogen-added styrene-isoprene-styrene block copolymer. Furthermore, syndiotactic 1,2-polybutadiene, ethylene-vinyl acetate copolymer, propylene-α-olefin (with a carbon number of 2 to 12) copolymer are also applicable.

The binder may include an electron-conductive polymer or an ion-conductive polymer. Examples of such an electron-conductive polymer include polyacetylene. In this case, the binder exhibits the function of the conductive material, so that the addition of the conductive material can be omitted. Examples of the ion-conductive polymer include conductive polymers obtained by complexing a polymer compound such as polyethylene oxide or polypropylene oxide, and a lithium salt or an alkali metal salt mainly containing lithium.
(Conductive Material)

Examples of the conductive material include carbon powder of carbon black or the like, carbon nanotube, other carbon materials, micropowder of metal such as copper, nickel, stainless steel, or iron, a mixture of the carbon material and the metal micropowder, and a conductive oxide such as ITO.
(Negative Electrode Current Collector)

The negative electrode current collector 32 may be formed of any kind of conductive plate material. For example, a metal thin plate of an aluminum, copper, or nickel foil can be used.
(Negative Electrode Active Material)

For the negative electrode active material, any compound capable of intercalating and deintercalating lithium ions can be used. A known negative electrode active material for a battery can be used. Examples of the negative electrode active material include particles including: a carbon material such as graphite (natural graphite and synthetic graphite) capable of intercalating and deintercalating lithium ions, carbon nanotube, hard carbon, soft carbon, or low-temperature fired carbon; metal that can form a compound with lithium, such as aluminum, silicon, or tin; an amorphous compound mainly containing oxide, such as silicon dioxide or tin dioxide; and lithium titanate ($Li_4Ti_5O_{12}$). In particular, graphite that is relatively stable and has high capacity per unit weight can be used.

The binder and the conductive material for the negative electrode may be the same as those used for the positive electrode.
(Fabrication Method for Electrodes 20 and 30)

Next, a fabrication method for the electrodes 20 and 30 according to the embodiment is described.

The active material, the binder, and the solvent are mixed. A conductive material may be added if necessary. Examples of the solvent to be used include water and N-methyl-2-pyrrolidone. A method of mixing the components in the paint is not limited to the particular method. Moreover, the order of mixing the components is not limited to the particular one. The paint is applied to the current collectors 22 and 32. A method of applying the paint is not particularly limited and may be a method normally employed in the fabrication of the electrode.

Next, the solvent in the paint applied on the current collectors 22 and 32 is removed. A method of removing the solvent is not limited to the particular method. The current collectors 22 and 32 with the paint applied thereon may be dried under the atmosphere of, for example, 80° C. to 150° C.

The electrode with the positive electrode active material layer 24 and the negative electrode active material layer 34 formed as above is pressed in a roll-pressing apparatus or the like if necessary. The linear pressure of the roll pressing can be set to, for example, 10 to 50 kgf/cm.

Through the above process, the electrodes including the electrode active material layers 24 and 34 formed on the current collectors 22 and 32 are obtained.

(Electrolyte Solution)

The electrolyte solution according to the embodiment includes a solute, a solvent, and an additive.

(Solute)

In the case of the lithium ion secondary battery, a lithium salt is used as the solute. The lithium salt is not limited to the particular kind and may be a known lithium salt. Specific examples of the lithium salt include $LiPF_6$, $LiClO_4$, $LiBF_4$, $LiAsF_6$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, $LiN(SO_2F)_2$, and $LiN(CF_3CF_2CO)_2$. One of these salts may be used alone or two or more salts may be used in combination. The solute may be $LiPF_6$, $LiBF_4$, or $LiN(SO_2F)_2$ from the viewpoint of the cycle characteristic and the storage characteristic. In particular, $LiPF_6$ can be used. Either in the case of using one kind of solvent or two or more kinds of solvents, the concentration of the solute can be set in the range of 0.8 to 1.5 M.

(Solvent)

The solvent is not particularly limited and may be a solvent used in a known electrochemical device. Examples of the solvent include ethylene carbonate, propylene carbonate, butylene carbonate, γ-butyrolactone, γ-valerolactone, dimethoxymethane, 1,2-dimethoxyethane, tetrahydrofurane, 2-methyltetrahydrofurane, 1,3-dioxylene, 4-methyl-1,3-dioxylene, methyl formate, methyl acetate, methyl propionate, dimethyl carbonate, ethylmethyl carbonate, diethyl carbonate, acetonitrile, sulfolane, 2-methyl sulfolane, dimethyl sulfoxide, N,N-dimethylformamide, and N-methyloxazolidinone. Any one of these kinds of solvents can be used alone or a plurality of kinds of solvents selected from those above can be used in combination. From the viewpoint of the cycle characteristic and the storage characteristic, a cyclic carbonate or a chain carbonate can be particularly used. Above all, ethylene carbonate or diethyl carbonate can be used.

(Additive)

The additive may be a known additive. Examples of the additive include fluoroethylene carbonate, vinylene carbonate, 1,3-propane sultone, 1,3,2-dioxathiolane 2,2-dioxide, and ethylene sulfite. Any of these may be used alone or may be used in combination with another and the amount thereof may be 0.01 to 5 mass %.

(Case)

The case 50 has the stacked body 40 and the electrolyte solution sealed therein. The case 50 may be any case that can suppress, for example, the leakage of the electrolyte solution to the outside and the intrusion of moisture from the outside into the electrochemical device. An applicable example of the case 50 is a metal-laminated film obtained by coating each surface of a metal foil 52 with a polymer film 54 as illustrated in FIG. 1. An applicable example of the metal foil 52 is an aluminum foil. An applicable example of the polymer film 54 is a polypropylene film. An example of the material for the polymer film 54 on the outside is a polymer with a high melting point, such as polyethylene terephthalate (PET) or polyamide. An example of the material for the polymer film 54 on the inside is polyethylene (PE) or polypropylene (PP).

(Lead)

The leads 60 and 62 are formed of a conductive material such as aluminum.

The leads 62 and 60 are respectively welded to the positive electrode current collector 22 and the negative electrode current collector 32 by a known method. As illustrated in FIG. 2, the separator 10 held between the positive electrode active material layer 24 of the positive electrode 20 and the negative electrode active material layer 34 of the negative electrode 30 is inserted into the case 50 together with the electrolyte solution (not shown in FIG. 2). After that, the opening of the case 50 is sealed. The detailed description has been made of the example of the separator, the electrolyte solution, and the electrodes according to the embodiment, the lithium ion secondary battery according to the embodiment including those components, and the manufacturing method for the same. The embodiment is, however, not limited to the embodiment above.

EXAMPLES

The embodiment will be more specifically described with reference to Examples and Comparative Examples. The embodiment is, however, not limited by the examples below.

Example 1

(Fabrication of Inorganic Particles)

First, 95 mass % of alumina (average particle diameter: 0.20 μm) as the inorganic particles and 5 mass % of the compound containing sulfur 1,3,2-dioxathiolane 2,2-dioxide (DTD) as the sulfur source were mixed. The obtained mixture was further mixed using a planetary ball mill. A medium for the planetary ball mill was zirconia beads with a diameter of 3 mm. The number of rotations of the mill was set to 500 rpm and the mixing time was set to 60 minutes. After that, the mixture of alumina and 1,3,2-dioxathiolane 2,2-dioxide (DTD) was input to an electric furnace. The air in the electric furnace was replaced by nitrogen atmosphere. The mixture was heated for three hours at 250° C. in the electric furnace. The mixture after the heating was pulverized and mixed again using the planetary ball mill under the same condition as the above condition. The pulverized mixture was used in Example 1.

(Fabrication of Separator)

First, 30 mass % of alumina processed as above as the inorganic particles included in the heat-resistant porous layer, 5 mass % of styrene-butadiene rubber (SBR) as the resin, 1 mass % of carboxymethyl cellulose as the thickener, and 64 mass % of water as the solvent were mixed. The obtained mixture was further mixed using a planetary ball mill, thereby preparing a paint. This paint was applied on one surface of a porous film (with a thickness of 16 μm) mainly formed of polyolefin, which is a thermoplastic polymer, using a commercial bar coater. The porous film with the paint applied thereon was dried at 60° C. for an hour, thereby fabricating the separator. The amount of application was adjusted so that the heat-resistant porous layer had a thickness of approximately 3 μm.

(Measurement of Content Amount of Sulfur)

The content ratio of sulfur in the heat-resistant porous layer was measured by the X-ray photoelectron spectroscopy (XPS) using [PHI Quantera II manufactured by ULVAC-PHI, Inc.]. The preparation of the sample was conducted in a glove box with an Ar atmosphere without being exposed to the air. Through this measurement, the content amount of the sulfur and the presence of the sulfur in the state of sulfate ($SO_4^{2-}$) or organosulfate (R—O—$SO_2$—O—R) have been clarified.
(Measurement of State of Sulfur)

For measuring the state of the sulfur, TOF-SIMS (Time-of-Flight Secondary Mass Spectrometry) can be used. Through this measurement, whether the sulfur is present in the state of compound such as DTD can be known. It has been confirmed that the sulfur is present as DTD in the heat-resistant porous layer of the separator fabricated in Example 1.

[Measurement of Peeling Strength]

The peeling strength was tested using a tensile testing instrument [AGS-100NX manufactured by Shimadzu Corporation] under a condition of 23° C. and 50% RH by a peeling method (peeling speed of 300 mm/min). The peeling strength at the interface between the thermoplastic porous layer and the heat-resistant porous layer was measured. The peeling strength was measured over time along a length of 100 mm from the start to the end of the measurement. The average value of the obtained measurement values was used as the peeling strength of the sample.

Examples 2 to 6

In the fabrication in Examples 2, 3, 4, 5 and 6, the sample was fabricated and measured under the same condition as the condition in Example 1 except that the amount of DTD used in the preparation of the inorganic particles was set to 4, 7, 9, 11, and 15 mass %, respectively.

Example 7

The sample was fabricated and measured under the same condition as the condition in Example 1 except that 9 mass % of poly(acrylic acid) (PAA) was used as the resin in the fabrication of the separator.

Example 8

The sample was fabricated and measured under the same condition as the condition in Example 1 except that 6 mass % of poly(acrylic acid) (PAA) was used as the resin in the fabrication of the separator.

Example 9

The sample was fabricated and measured under the same condition as the condition in Example 1 except that 5 mass % of poly(acrylic acid) (PAA) was used as the resin in the fabrication of the separator.

Example 10

The sample was fabricated and measured under the same condition as the condition in Example 1 except that 5 mass % of polyvinylidene fluoride (PVDF) was used as the resin in the fabrication of the separator.

Example 11

The sample was fabricated and measured under the same condition as the condition in Example 1 except that 5 mass % of 1,3-propane sultone (PS) was used instead of 1,3,2-dioxathiolane 2,2-dioxide (DTD) in the fabrication of the separator.

Example 12

The sample was fabricated and measured under the same condition as the condition in Example 1 except that 5 mass % of dimethyl sulfoxide was used instead of 1,3,2-dioxathiolane 2,2-dioxide (DTD) in the fabrication of the separator.

Example 13

The sample was fabricated and measured under the same condition as the condition in Example 1 except that 95 mass % of alumina was used as the inorganic particles, and 2.5 mass % of each of 1,3,2-dioxathiolane 2,2-dioxide (DTD) and 1,3-propane sultone (PS) was used as the sulfur source in the fabrication of the separator.

Example 14

The sample was fabricated and measured under the same condition as the condition in Example 1 except that calcium carbonate was used as the inorganic particles instead of alumina in the fabrication of the separator.

Example 15

The sample was fabricated and measured under the same condition as the condition in Example 1 except that boehmite was used as the inorganic particles instead of alumina in the fabrication of the separator.

Example 16

The sample was fabricated and measured under the same condition as the condition in Example 1 except that 93 mass % of boehmite was used as the inorganic particles instead of the alumina and 7 mass % of 1,3,2-dioxathiolane 2,2-dioxide (DTD) was used as the sulfur source in the fabrication of the separator.

Example 17

The sample was fabricated and measured under the same condition as the condition in Example 1 except that 90 mass % of boehmite was used as the inorganic particles instead of the alumina and 10 mass % of 1,3,2-dioxathiolane 2,2-dioxide (DTD) was used as the sulfur source in the fabrication of the separator.

Example 18

The separator fabricated by the same procedure as that in Example 1 was heated for an hour at 70° C. The surface of the heat-resistant porous layer of the obtained separator was measured by the X-ray photoelectron spectroscopy (XPS) using [PHI Quantera II manufactured by ULVAC-PHI, Inc.]. As a result, the peak of the measurement value was observed in the range of 166 eV to 174 eV. This has proved the presence of the compound containing sulfur. Further, the thermoplastic porous layer was peeled from the sample. Then, the surface of the heat-resistant porous layer that is in contact with the thermoplastic porous layer was subjected to the measurement based on the X-ray photoelectron spectroscopy. As a result, the peak of the measurement value was observed in the range of 166 eV to 174 eV. This has proved the presence of the compound containing sulfur on the measured surface. The amount of sulfur in the separator was 2.4 mol % on the surface of the heat-resistant porous layer and 1.3 mol % on the surface of the heat-resistant porous layer that is in contact with the thermoplastic porous layer.

With the use of the separator fabricated by the same procedure as that in Example 18, a lithium ion secondary battery was fabricated. The procedure of fabricating the negative electrode, the positive electrode, and the electrolyte solution is described below.

(Fabrication of Negative Electrode)

Synthetic graphite as the negative electrode active material, styrene-butadiene rubber (SBR) as the binder, carboxymethyl cellulose, and water as the solvent were mixed, thereby preparing a paint. This paint was applied to a copper foil (with a thickness of 15 μm) as the current collector by a doctor blade method. The copper foil with the paint applied thereon was dried at 80° C. After that, the dried copper foil was pressed, thereby forming the negative electrode active material layer on the surface of the copper foil. For connecting an external extraction terminal, the copper foil was provided with a portion on which the paint was not applied. As the external extraction terminal, a nickel foil with polypropylene, which was obtained by grafting maleic anhydride, wounded therearound was prepared for the purpose of improving the sealing property with the exterior body. This nickel foil and the copper foil with the negative electrode active material layer were welded to each other with ultrasonic waves.

(Fabrication of Positive Electrode)

$LiCoO_2$ as the positive electrode active material, polyvinylidene fluoride as the binder, carbon black and graphite as the conductive auxiliary agent, and N-methyl-2-pyrrolidone as the solvent were mixed, thereby preparing a paint. This paint was applied to an aluminum foil (with a thickness of 20 μm) as the current collector by a doctor blade method. The aluminum foil with the paint applied thereon was dried at 100° C. After that, the dried aluminum foil was pressed, thereby forming the positive electrode active material layer on the surface of the aluminum foil. For connecting an external extraction terminal, the aluminum foil was provided with a portion on which the paint was not applied. As the external extraction terminal, an aluminum foil with polypropylene, which was obtained by grafting maleic anhydride, wounded therearound was prepared for the purpose of improving the sealing property with the exterior body. This aluminum foil and the aluminum foil with the positive electrode active material layer were welded to each other with ultrasonic waves.

(Fabrication of Electrolyte Solution)

First, 30 vol % of ethylene carbonate and 70 vol % of diethyl carbonate were mixed. To the obtained solution, $LiPF_6$ was dissolved at a concentration of 1 M. Thus, the nonaqueous electrolyte solution was prepared.

(Fabrication of Lithium Ion Secondary Battery Cell)

The positive electrode, the negative electrode, and the separator fabricated as above were cut into a predetermined size. The cut positive electrode, negative electrode, and separator were stacked in the order of the negative electrode, the separator (heat-resistant porous layer), and the positive electrode, thereby fabricating the stacked body. The heat-resistant porous layer of the separator was stacked opposite to the positive electrode side. The stacked body was put into the exterior body. An appropriate amount of the above electrolyte solution was added into the exterior body and the exterior body was then sealed to vacuum. Thus, the lithium ion secondary battery was obtained.

After the lithium ion secondary battery fabricated as above was placed for 24 hours, the battery was disassembled and the stacked body was extracted. In the extracted stacked body, the positive electrode and the separator were separated from each other. As a result, a part of the heat-resistant porous layer was found adhered to the surface of the positive electrode. This indicates that the positive electrode and the heat-resistant porous layer were very closely attached.

Comparative Example 1

(Fabrication of Separator)

A paint was prepared by mixing 30 mass % of alumina as the inorganic particles to be included in the heat-resistant porous layer, 5 mass % of styrene-butadiene rubber (SBR) as the resin, 1 mass % of carboxymethyl cellulose as the thickener, and 64 mass % of water as the solvent. This paint was applied on one surface of a porous film (with a thickness of 16 μm) mainly formed of polyolefin, which is a thermoplastic polymer, using a commercial bar coater. The porous film with the paint applied thereon was dried at 60° C. for five minutes, thereby fabricating the separator. The amount of application was adjusted so that the heat-resistant porous layer had a thickness of approximately 3 μm. The content amount of sulfur and the peeling strength were measured by the same method as that in Example 1.

Comparative Example 2

The sample was fabricated and measured under the same condition as that in Comparative Example 1 except that silica was used as the inorganic particles.

Table 1 shows the inorganic particles included in the heat-resistant porous layer (described as "inorganic particles" in Table 1), the compound containing sulfur as the sulfur source (described as "sulfur source" in Table 1), the resin in the heat-resistant porous layer (described as "resin" in Table 1), the sulfur content ratio in the heat-resistant porous layer obtained as a result of the analysis (described as "sulfur amount" in Table 1), and the result of the peeling test in regard to Examples 1 to 17 and Comparative Examples 1 and 2. As shown in Table 1, the peeling strength is higher in Examples 1 to 17.

The surface of the heat-resistant porous layer of the separator fabricated in Examples 1 and 3 was measured by the X-ray photoelectron spectroscopy (XPS) using [PHI Quantera II manufactured by ULVAC-PHI, Inc.]. As a result, the peak of the measurement value was observed in the range of 166 eV to 174 eV. This has proved the presence of the compound containing sulfur. It has been also confirmed that any separator has two measurement value peaks at 169.8 eV and 170.3 eV. This indicates that a part of the compound containing sulfur has changed. It is therefore estimated that the peeling strength characteristic is improved because the compound containing sulfur is in the activated state.

TABLE 1

| | Inorganic particles | Sulfur source | Resin | Sulfur amount mol % | Peeling strength (N) |
|---|---|---|---|---|---|
| Example 1 | alumina | DTD | SBR | 2.4 | 6.77 |
| Example 2 | alumina | DTD | SBR | 2.2 | 6.5 |
| Example 3 | alumina | DTD | SBR | 2.8 | 6.6 |
| Example 4 | alumina | DTD | SBR | 3 | 6.5 |
| Example 5 | alumina | DTD | SBR | 3.2 | 5.9 |
| Example 6 | alumina | DTD | SBR | 4 | 5.7 |
| Example 7 | alumina | DTD | PAA | 3.1 | 6.2 |
| Example 8 | alumina | DTD | PAA | 2.6 | 6.4 |
| Example 9 | alumina | DTD | PAA | 2.4 | 6.28 |
| Example 10 | alumina | DTD | PVDF | 1.44 | 5.4 |
| Example 11 | alumina | PS | SBR | 0.22 | 5.29 |
| Example 12 | alumina | dimethyl | SBR | 1.2 | 5.63 |

TABLE 1-continued

|  | Inorganic particles | Sulfur source | Resin | Sulfur amount mol % | Peeling strength (N) |
|---|---|---|---|---|---|
| | | sulfoxide | | | |
| Example 13 | alumina | DTD + PS | SBR | 2 | 5.82 |
| Example 14 | calcium carbonate | DTD | SBR | 0.68 | 4.64 |
| Example 15 | boehmite | DTD | SBR | 2.3 | 6.01 |
| Example 16 | boehmite | DTD | SBR | 2.7 | 5.38 |
| Example 17 | boehmite | DTD | SBR | 3.5 | 5.54 |
| Comparative Example 1 | alumina | None | SBR | 0 | 3.78 |
| Comparative Example 2 | silica | None | SBR | 0 | 2.64 |

According to the embodiment, as described above, the separator in which the falloff of the inorganic particles in the heat-resistant porous layer is suppressed can be provided.

The separator according to the embodiment of the present disclosure may be any of the following first to eighth separators.

The first separator includes: a porous base material including a thermoplastic resin; and a heat-resistant porous layer containing inorganic particles and resin on at least one surface of the porous base material. The heat-resistant porous layer contains sulfur.

In the second separator according to the first separator, when the heat-resistant porous layer is analyzed by X-ray photoelectron spectroscopy, the binding energy of at least a part of the sulfur has a peak in the range of 166 eV to 174 eV.

In the third separator according to the first or second separator, the heat-resistant porous layer includes a compound containing sulfur.

In the fourth separator according to the third separator, the compound containing sulfur is an organosulfate.

In the fifth separator according to the third separator, the compound containing sulfur is 1,3,2-dioxathiolane 2,2-dioxide (DTD).

In the sixth separator according to the fifth separator, 1,3,2-dioxathiolane 2,2-dioxide is contained by 1 to 3 mol % in total relative to all the elements of the heat-resistant porous layer.

In the seventh separator according to any of the first to sixth separators, the inorganic particles are at least one kind selected from alumina and boehmite.

In the eighth separator according to any of the first to seventh separators, the resin is at least one kind selected from styrene-butadiene rubber (SBR) and poly(acrylic acid) (PAA).

A lithium ion secondary battery according to the embodiment of the present disclosure may include any of the first to eighth separators interposed between a positive electrode and a negative electrode, and an electrolyte solution. The heat-resistant porous layer is disposed between the positive electrode and the porous base material. Sulfur is distributed unevenly in the heat-resistant porous layer so as to exist in larger amount near a surface thereof opposite to the porous base material.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A separator comprising a porous base material including a thermoplastic resin, wherein
the porous base material has a heat-resistant porous layer on at least one surface thereof, and
the heat-resistant porous layer contains inorganic particles, a resin, and sulfur,
the sulfur is distributed unevenly in the heat-resistant porous layer so as to exist in larger amount near a surface thereof opposite to the porous base material.

2. The separator according to claim 1, wherein when the heat-resistant porous layer is measured by X-ray photoelectron spectroscopy, a measurement value of binding energy of at least a part of the sulfur has a peak in the range of 166 eV to 174 eV.

3. The separator according to claim 2, wherein the heat-resistant porous layer includes a compound containing sulfur.

4. The separator according to claim 2, wherein the inorganic particles are at least one of alumina and boehmite.

5. The separator according to claim 2, wherein the resin is at least one of styrene-butadiene rubber (SBR) and poly(acrylic acid) (PAA).

6. A lithium ion secondary battery comprising:
the separator according to claim 2 interposed between a positive electrode and a negative electrode; and
an electrolyte solution, wherein
the heat-resistant porous layer is disposed between the positive electrode and the porous base material; and
the sulfur is distributed unevenly in the heat-resistant porous layer so as to exist in larger amount near a surface thereof opposite to the porous base material.

7. The separator according to claim 1, wherein the heat-resistant porous layer includes a compound containing sulfur.

8. The separator according to claim 7, wherein the inorganic particles are at least one of alumina and boehmite.

9. The separator according to claim 7, wherein the resin is at least one of styrene-butadiene rubber (SBR) and poly(acrylic acid) (PAA).

10. A lithium ion secondary battery comprising:
the separator according to claim 7 interposed between a positive electrode and a negative electrode; and
an electrolyte solution, wherein
the heat-resistant porous layer is disposed between the positive electrode and the porous base material; and
the sulfur is distributed unevenly in the heat-resistant porous layer so as to exist in larger amount near a surface thereof opposite to the porous base material.

11. The separator according to claim 1, wherein the inorganic particles are at least one of alumina and boehmite.

12. The separator according to claim 1, wherein the resin is at least one of styrene-butadiene rubber (SBR) and poly(acrylic acid) (PAA).

13. A lithium ion secondary battery comprising:
the separator according to claim 1 interposed between a positive electrode and a negative electrode; and
an electrolyte solution, wherein
the heat-resistant porous layer is disposed between the positive electrode and the porous base material; and the sulfur is distributed unevenly in the heat-resistant porous layer so as to exist in larger amount near a surface thereof opposite to the porous base material.

14. A lithium ion secondary battery comprising:
the separator according to claim 1 interposed between a positive electrode and a negative electrode; and
an electrolyte solution, wherein
the heat-resistant porous layer is disposed between the positive electrode and the porous base material; and
the sulfur is in the form of a compound and is segregated on the surface of the inorganic particle.

15. The separator according to claim 1, wherein the sulfur is in the form of a compound and is segregated on the surface of the inorganic particle.

16. A separator comprising a porous base material including a thermoplastic resin, wherein
the porous base material has a heat-resistant porous layer on at least one surface thereof, and
the heat-resistant porous layer contains inorganic particles, a resin, and sulfur,
wherein the compound containing sulfur is an organosulfate.

17. The separator according to claim 16, wherein wherein when the heat-resistant porous layer is measured by X-ray photoelectron spectroscopy, a measurement value of binding energy of at least a part of the sulfur has a peak in the range of 166 eV to 174 eV.

18. The separator according to claim 17, wherein the compound containing sulfur is 1,3,2-dioxathiolane 2,2-dioxide (DTD).

19. The separator according to claim 18, wherein 1,3,2-dioxathiolane 2,2-dioxide is contained by 1 to 3 mol % relative to all the elements of the heat-resistant porous layer.

20. The separator according to claim 16, wherein the compound containing sulfur is 1,3,2-dioxathiolane 2,2-dioxide (DTD).

21. The separator according to claim 20, wherein 1,3,2-dioxathiolane 2,2-dioxide is contained by 1 to 3 mol % relative to all the elements of the heat-resistant porous layer.

* * * * *